(12) United States Patent
Ryba et al.

(10) Patent No.: US 12,392,410 B2
(45) Date of Patent: Aug. 19, 2025

(54) PISTON, GEAR-CHANGE SELECTOR MODULE AND MOUNTING METHOD

(71) Applicant: Valeo Powertrain GmbH, Ebern (DE)

(72) Inventors: Jürgen Ryba, Ebern (DE); Gerhard Warmuth, Ebern (DE); Dieter Grimmer, Ebern (DE); Ralph Berger, Ebern (DE)

(73) Assignee: Valeo Powertrain GmbH, Ebern (DE)

( * ) Notice: Subject to any disclaimer, the term of this patent is extended or adjusted under 35 U.S.C. 154(b) by 0 days.

(21) Appl. No.: 18/709,559

(22) PCT Filed: Dec. 13, 2022

(86) PCT No.: PCT/EP2022/085580
§ 371 (c)(1),
(2) Date: May 13, 2024

(87) PCT Pub. No.: WO2023/110848
PCT Pub. Date: Jun. 22, 2023

(65) Prior Publication Data
US 2025/0003490 A1    Jan. 2, 2025

(30) Foreign Application Priority Data

Dec. 14, 2021   (DE) .................... 10 2021 133 069.6

(51) Int. Cl.
*F16H 63/30* (2006.01)
*F16J 1/00* (2006.01)

(52) U.S. Cl.
CPC .......... *F16H 63/3023* (2013.01); *F16J 1/008* (2013.01)

(58) Field of Classification Search
CPC ... F16J 1/001; F16J 1/003; F16J 1/008; F16H 63/3023
See application file for complete search history.

(56) References Cited

U.S. PATENT DOCUMENTS 3,802,323 A * 4/1974 Suechting ................. F16J 1/22
92/187
6,766,710 B2 * 7/2004 Reul ................... F16H 63/3023
74/473.11

(Continued)

FOREIGN PATENT DOCUMENTS

DE    41 10 542 A1    10/1992
EP    1 164 316 A2    12/2001

(Continued)

OTHER PUBLICATIONS

International Search Report issued Feb. 17, 2023 in PCT/EP2022/085580, filed on Dec. 13, 2022, 4 pages.

(Continued)

*Primary Examiner* — Michael Leslie
(74) *Attorney, Agent, or Firm* — Oblon, McClelland, Maier & Neustadt, L.L.P.

(57) ABSTRACT

A piston for a gear-change selector module of a gearshift has a piston body, at least one sealing element, and a cap which is attached to the piston body by means of a clip connection. Furthermore, the sealing element is here attached to the piston body by means of the cap. Also a gear-change selector module with a piston, and a method for mounting a piston, are provided.

20 Claims, 2 Drawing Sheets

(56) References Cited

U.S. PATENT DOCUMENTS

| | | | |
|---|---|---|---|
| 6,813,990 B2 * | 11/2004 | Shiina | F16J 15/3244 |
| | | | 92/172 |
| 11,905,979 B2 * | 2/2024 | Schorn | F16H 63/3023 |
| 2016/0363233 A1 | 12/2016 | McAuliffe et al. | |

FOREIGN PATENT DOCUMENTS

| | | |
|---|---|---|
| EP | 2 006 548 A1 | 12/2008 |
| GB | 981607 A | 1/1965 |

OTHER PUBLICATIONS

German Search Report issued Aug. 24, 2022 in DE application 10 2021 133 069.6, filed on Dec. 14, 2021, 7 pages (with English translation of Categories of Cited Documents).

* cited by examiner

PISTON, GEAR-CHANGE SELECTOR MODULE AND MOUNTING METHOD

BACKGROUND OF THE INVENTION

Field of the Invention

The invention concerns a piston for a gear-change selector module of a gearshift, with a piston body and at least one sealing element. The invention furthermore concerns a gear-change selector module for a gearshift of a motor vehicle with at least one such piston, and a method for mounting a piston of a gear-change selector module.

Description of the Related Art

Gear-change selector modules are parts of a transmission mechanism. They serve to create the adjustment movements for shifting between different gears of the transmission. A hydraulically actuated gear-change selector usually has several hydraulic cylinders which are adjusted when a gear is to be selected. The stroke of the pistons is transferred to different shift forks. The pistons of the hydraulic cylinders are pressurized with hydraulic fluid in order to assume predefined piston positions corresponding to different shift positions.

For this, the pistons comprise sealing elements which guarantee that the pistons lie tightly against the cylinder wall and thus form chambers in the cylinders which can be reliably pressurised. In order to ensure a defined seat of the sealing elements and avoid the sealing elements being lost during logistics or mounting, the sealing elements are usually attached to the piston body.

BRIEF SUMMARY OF THE INVENTION

The production of such pistons is therefore associated with high cost in order to meet the high requirements for reliability and quality.

The object of the invention is to provide a piston and a gear-change selector module with such a piston, which can be produced at low cost. Another object of the invention is to provide a method for mounting a piston of a gear-change selector module.

This object is achieved by a piston for a gear-change selector module of a gearshift, with a piston body and at least one sealing element. The piston furthermore has a cap which is attached to the piston body by means of a clip connection. Here, the sealing element is attached to the piston body by means of the cap, whereby the sealing element can be reliably attached to the piston body at low cost. The clip connection here comprises corresponding latching elements which ensure an effective connection of the cap to the piston body so that the sealing element is captively attached. Furthermore, during mounting, the sealing element must not be excessively stretched in order to reach its receiver. This prevents an undesirable deterioration of the material properties.

In particular, the clip connection is play-free, i.e. the cap is attached to the piston body play-free by means of the clip connection.

According to one embodiment, the cap is part of a piston end face of the piston which can be pressurised with a working fluid, in particular wherein the cap can be attached to the piston body in the axial direction by means of the clip connection. In this way, during operation of the piston, the cap is pressed by the pressure loading the piston end face into a closed position of the clip connection, i.e. a position in which the latching elements of the clip connection are in mutual engagement. Thus even under high pressures during operation, it is guaranteed that the cap and hence the sealing element are securely attached to the piston body.

According to a further embodiment, the at least one sealing element is an inner sealing element which is received in an inner receiver of the piston body, and/or an outer sealing element which is received in an outer receiver of the piston body. In the sense of the invention, the terms "inner" and "outer" refer in particular to the radial distance of the sealing element from a centre longitudinal axis of the piston.

Here, the inner sealing element and/or the outer sealing element may be attached to the piston body by means of the cap. Thus the inner sealing element, the outer sealing element, or both the inner and the outer sealing elements are attached to the piston body by means of the cap. This has the advantage that the corresponding sealing elements can be fixed jointly and hence at low cost by means of the cap.

In addition or alternatively, in one embodiment, the inner receiver is designed to be complementary to the inner sealing element in the unloaded state, and/or the outer receiver is designed to be complementary to the outer sealing element in unloaded state. The term "unloaded" here in particular means the state of the sealing element in which the sealing element is in the unstretched state before mounting of the sealing element. Because of this design, the inner sealing element or the outer sealing element is received in the assigned receiver such that the corresponding sealing element is not stretched. This ensures that, in mounted state, the corresponding sealing element has a defined form and hence provides a defined sealing effect.

Here, the inner receiver and/or the outer receiver may each have no undercut in which the inner or outer sealing element engages in the radial direction. This design has the advantage that the sealing body is simpler in design and can be produced at low cost.

In a further embodiment, the piston body is designed such that, viewed in the axial direction, the inner and/or outer sealing element is not concealed by the piston body. In particular, this means that the inner and/or outer sealing element is not concealed even in portions by the piston body. In other words, in the axial direction, the sealing elements are completely visible and may thus be pushed onto the piston body in the axial direction without being stretched, as would be necessary for example if the sealing elements had to be pushed over an extension or shoulder of the piston body. Thus the piston can be produced at low cost.

According to the invention, to achieve the above-mentioned object, a gear-change selector module for a motor vehicle is also provided which has at least one, preferably several pistons according to the invention, with the above-mentioned advantages.

Furthermore, according to the invention, to achieve the above-mentioned object, a method is provided for mounting a piston of a gear-change selector module. The piston here has a piston body, a cap and an inner sealing element and/or an outer sealing element. The method comprises the following steps:

a) insertion of the inner sealing element into an inner receiver of the piston body in the axial direction and/or of the outer sealing element into an outer receiver of the piston body in the axial direction, and b) fixing of the cap to the piston body by means of a clip connection.

In this way, the piston can be mounted at low cost.

In one embodiment, it may be provided that on insertion of the inner and/or outer sealing element in step a), the inner and/or outer sealing element is not stretched. Thus the corresponding sealing elements retain their defined form in unloaded state and may thus reliably guarantee a high tightness. Furthermore, this embodiment has the advantage that no forces are required for stretching the corresponding sealing elements, whereby the method is particularly cost efficient.

BRIEF DESCRIPTION OF THE SEVERAL VIEWS OF THE DRAWINGS

Further advantages and features will become apparent from the following description and from the appended drawings, in which.

DETAILED DESCRIPTION OF THE INVENTION

Figure 1:
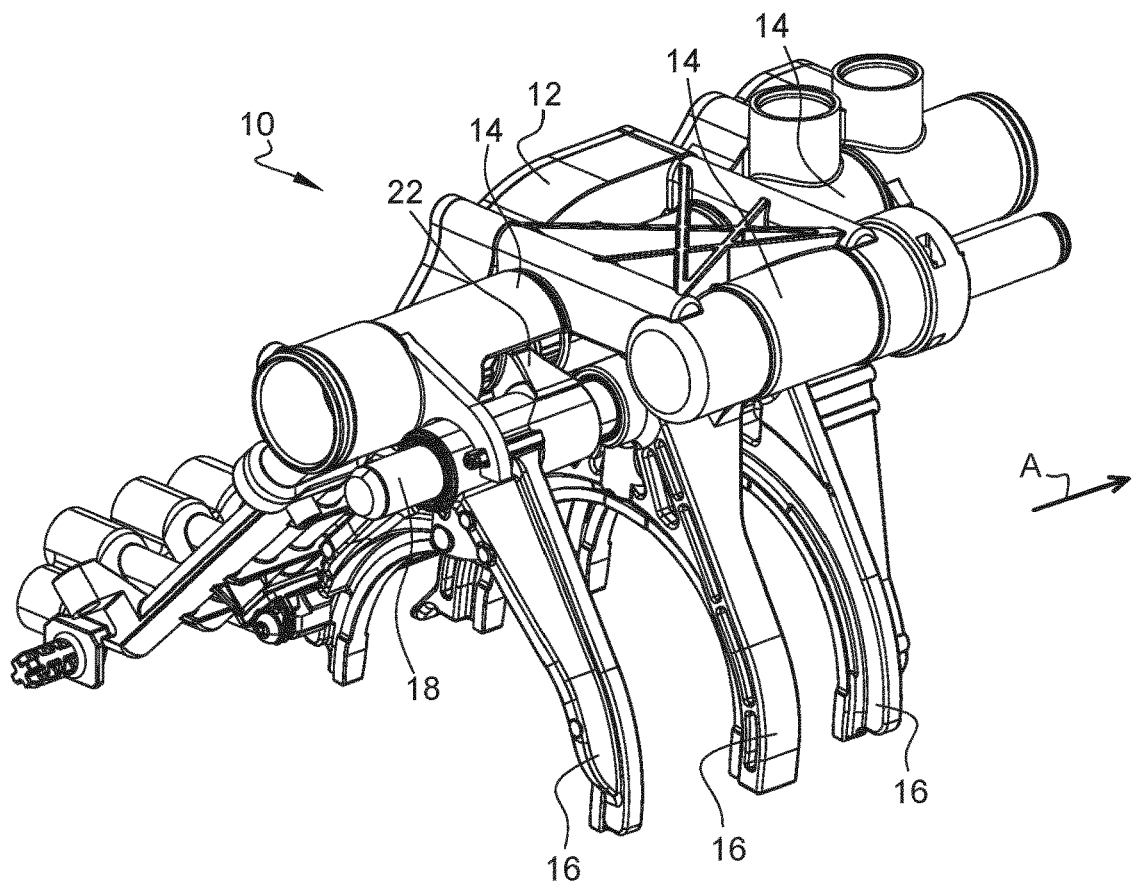
FIG. 1 shows a perspective illustration of a gear-change selector module according to the invention with several hydraulic cylinders and shift forks.

FIG. 1 shows a gear-change selector module 10 for a gearshift of a motor vehicle, which has a housing 12 with hydraulic cylinders 14 and several shift forks 16 which can be moved by means of the hydraulic cylinders 14 in the axial direction A on a shaft 18 of the gear-change selector module 10.

The hydraulic cylinders 14 each comprise a piston 20 (see FIG. 2) which is mounted in a piston receiver of the hydraulic cylinder 14 so as to be movable in or against the axial direction A.

The hydraulic cylinders 14 are here each coupled to one of the shift forks 16 via a carrier arm 22 of the shift fork 16, which engages radially in a recess 24 in the piston 20.

In an alternative embodiment, the gear-change selector module 10 has at least one hydraulic cylinder 14 which is coupled to at least one shift fork 16.

Figure 2:
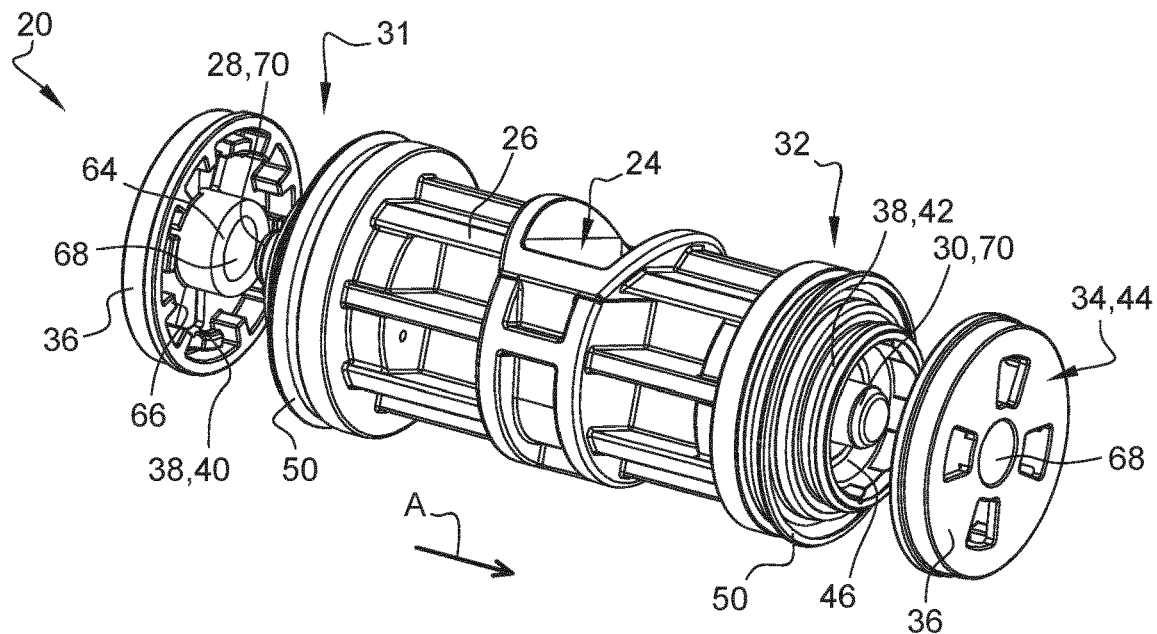
FIG. 2 shows a piston according to the invention in an exploded view.
Figure 3:
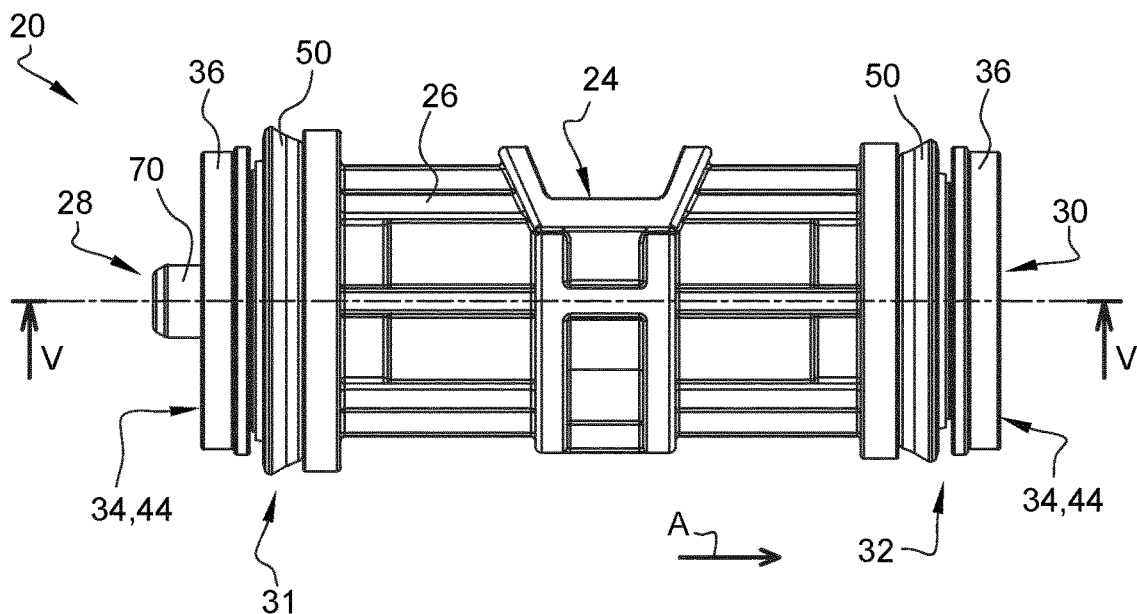
FIG. 3 shows a side view of the piston from FIG. 2.
Figure 4:
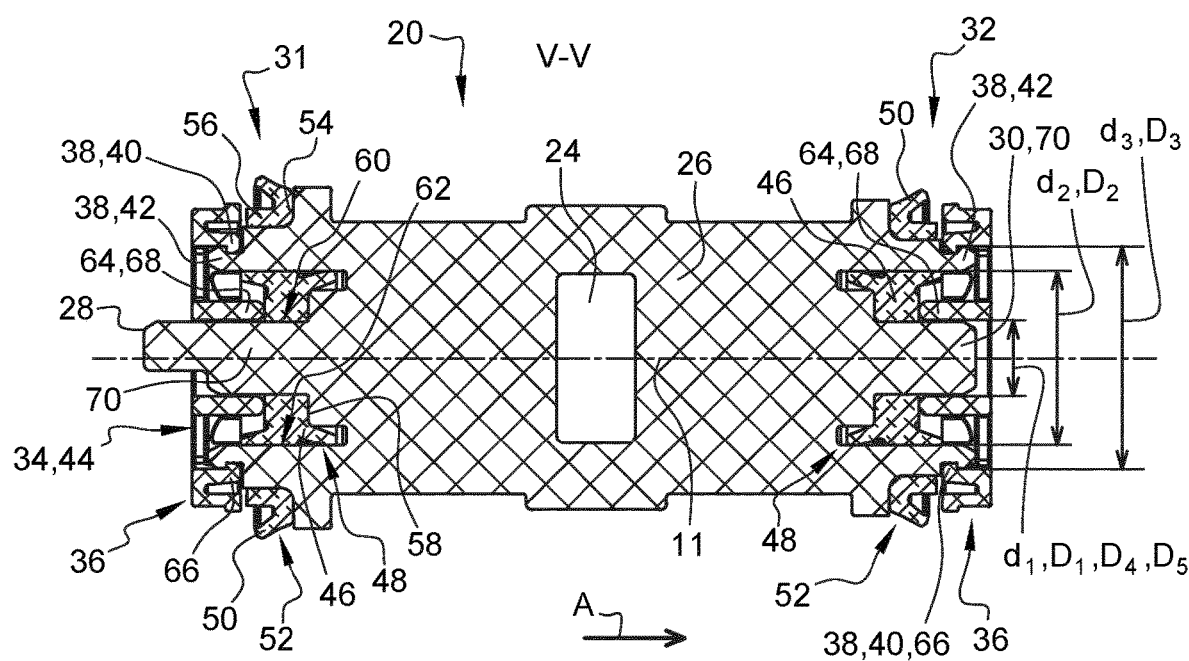
FIG. 4 shows a sectional view of the piston along plane V-V from FIG. 3.

With reference to FIGS. 2 to 4, it is now explained how the pistons 20 are designed, using the example of a piston 20.

The piston 20 has a piston body 26 which extends in the axial direction A from a first axial end 28 to a second axial end 30.

In the present embodiment, the piston body 26 is formed as one piece, whereby the piston 20 consists of particularly few parts.

Alternatively, the piston body 26 may consist of more than one component.

Furthermore, the recess 24 is arranged in or formed in the piston body 26.

In the present embodiment, the piston 20 is a double-action piston and accordingly at the first axial end 28 has a first sealing portion 31, and at the second axial end 30 a second sealing portion 32, each of which has a piston end face 34 of the piston 20 which can be pressurised with a working fluid.

In an alternative embodiment, the piston 20 may be a single-action piston which has a piston end face 34 that can be pressurised by a working fluid at only one axial end 28, 30.

In the present exemplary embodiment, the first sealing portion 31 and the second sealing portion 32 are formed substantially identically.

Evidently, in an alternative embodiment, the piston 20 may have only a single sealing portion 31, 32, or a first sealing portion 31 and a second sealing portion 32 which differ substantially from one another.

The structure of the sealing portions 31, 32 will now be explained using the example of the first sealing portion 31. The explanations apply accordingly to the second sealing portion 32, wherein the directional indication "in the axial direction A" must be replaced accordingly by "against the axial direction A" or vice versa.

The first sealing portion 31 has a cap 36 which is attached to the piston body 26 via a clip connection 38 (see FIG. 4).

The clip connection 38 is formed by latching elements 40 on the cap side and complementarily designed latching elements 42 on the piston body side, which engage with one another in the radial direction. Thus the cap 36 is fixed to the piston body 26, in particular play-free, both in and against the axial direction A.

The side 44 of the cap 36 opposite the piston body 26 in the axial direction A here forms a part of the corresponding piston end face 34 of the piston 20.

The cap 36 is made for example from a plastic and is thus particularly light, in the sense of low mass, and flexible.

Furthermore, the first sealing portion 31 has an inner sealing element 46 which is arranged in an inner receiver 48, and an outer sealing element 50 which is arranged in an outer receiver 52.

The inner sealing element 46 is here arranged radially closer to the centre longitudinal axis M of the piston 20 than the outer sealing element 50.

Furthermore, the inner sealing element 46 is arranged radially inside the outer sealing element 50, i.e. the inner sealing element 46 and the outer sealing element 50 are arranged at least in portions at the same height in the axial direction A and thus overlap when viewed in the radial direction.

The inner sealing element 46 and the outer sealing element 50 are here annular, i.e. closed in the circumferential direction around the centre longitudinal axis M.

In principle, the inner sealing element 46 and the outer sealing element 50 may be arbitrarily designed and/or arranged relative to one another.

The inner sealing element 46 is for example a sealing element which seals a breather channel in the piston body 26.

The outer sealing element 50 forms a piston seal which is configured to seal the radial gap between the piston body 26 and the piston receiver of the hydraulic cylinder 14. Thus the outer sealing element 50 protrudes beyond the piston body 26 in the radial direction, for example in the form of the sealing lip.

The outer receiver 52 is a combination of a ring groove on the end face, extending in the axial direction A, and a circumferential groove in the piston body 26. In other words, the outer receiver 52 is formed by a step in the piston body 26 which has an axial end face 54 extending in the radial direction, and a radial circumferential face 56 extending in the axial direction A.

The inner receiver 48 is a ring groove in the end face of the piston body 26 extending in the axial direction A, which has a base 58 extending in the radial direction and a radially inner side face 60 and a radially outer side face 62, which lie opposite one another and each extend in the axial direction A.

The end face ring groove, forming the receiver 48, is formed stepped in the present exemplary embodiment, whereby adjoining the base 58 in the radial direction is a portion which, at least in portions in the circumferential direction, is arranged offset to the base 58 in the axial direction A.

Here, the inner receiver 48 and the outer receiver 52 are each designed to be complementary to the inner sealing element 46 or outer sealing element 50 respectively, in particular in the unloaded state.

In the present exemplary embodiment, the inner diameter $D_1$ of the inner receiver 48 corresponds to the inner diameter $d_1$ of the inner sealing element 46 in unloaded state, while the outer diameter $D_2$ of the inner receiver 48 corresponds to the outer diameter $d_2$ of the inner sealing element 46 in unloaded state.

Furthermore, the inner diameter $D_3$ of the outer receiver 52 corresponds to the inner diameter $d_3$ of the outer sealing element 50 in unloaded state.

The radial circumferential face 56, the inner side face 60 and the outer side face 62 here extend directly in the axial direction A or parallel to the centre longitudinal axis M. Thus the inner receiver 48 and outer receiver 52 have no radial notches or undercuts in which the inner sealing element 46 or outer sealing element 50 could engage in the radial direction.

Furthermore, the piston body 26 is designed such that, viewed in the axial direction A, the inner receiver 48, in particular the base 58, and the outer receiver 52, in particular the axial end faces 54, are each completely visible when no sealing elements 46, 50 are arranged in the receivers 48, 52 and no cap 36 is attached to the piston body 26.

Thus the sealing elements 46, 50 are completely visible in the receivers 48, 52, viewed in the axial direction A, and can be inserted in the corresponding receivers 48, 52 in the axial direction A without being stretched.

In principle, in an alternative embodiment, the inner receiver 48 and the outer receiver 52 each can be of an arbitrary design.

In this context, the cap 36 has an inner holding portion 64 and an outer holding portion 66.

In mounted state, i.e. when the cap 36 is attached to the piston body 26, the inner holding portion 64 delimits the inner sealing element 46 in the axial direction A, and the outer holding portion 66 delimits the outer sealing element 50 in the axial direction A.

Here, the cap 36 and the piston body 26 are designed such that the inner sealing element 46 is arranged between the base 58 and the inner holding portion 64, play-free in the axial direction A and is thus fixed.

Furthermore, the cap 36 and the piston body 26 are designed such that the outer sealing element 50 is arranged between the axial end face 54 and the outer holding portion 66 play-free in the axial direction A and is thus fixed.

The sealing elements 46, 50, the receivers 48, 52 and the holding portions 64, 66 are here designed coaxially to the centre longitudinal axis M or to one another.

In order to align the cap 36 in the radial direction in defined fashion relative to the piston body 26, the cap 36 has a central guide portion 68 and the piston body 26 a complementarily formed guide peg 70, which in mounted state together form a guide in the axial direction A.

In the present embodiment, the guide peg 70 transforms steplessly into the inner side face 60 of the inner receiver 48 in the axial direction A. Thus the guide peg 70 has an outer diameter $D_4$ and the guide portion 68 has an inner diameter $D_5$ which each correspond to the outer diameter $D_1$ of the inner receiver 48.

The latching elements 40 on the cap side are here arranged on the outer holding portion 66.

In principle, the guide portion 68 and/or the latching elements 40 on the cap side may be arranged at any location on the cap 36, wherein the piston body 26 is complementarily designed accordingly.

For mounting the piston 20, first the inner sealing element 46 and the outer sealing element 50 are pushed in the axial direction A into the inner receiver 48 and outer receiver 52 of the piston body 26, and thus inserted therein.

Here, the inner sealing element 46 and the outer sealing element 50 are not stretched, in particular not in such a fashion that the inner diameter $d_1$, $d_3$ of the sealing elements 46, 50 changes.

The cap 36 is then fixed to the piston body 26 in the axial direction A by means of the clip connection 38.

In this way, the inner sealing element 46 and outer sealing element 50 are attached to the piston body 26 by means of the cap 36, so that no additional fixing means are required for fixing the sealing elements 46, 50.

In an alternative embodiment, at least one of the sealing elements is fixed to the piston body by means of the cap.

In this way, a piston 20 and a gear-change selector module 10 with the piston 20 provided which can be produced at low cost.

The invention claimed is:

1. A piston for a gear-change selector module of a gearshift, comprising:
   a piston body; and
   at least one sealing element,
   wherein the piston has a cap which is attached to the piston body by a play-free clip connection, and
   wherein the at least one sealing element is attached to the piston body by the cap such that the at least one sealing element is fixed.

2. The piston according to claim 1, wherein the cap is part of a piston end face of the piston which can be pressurized with a working fluid, and the cap can be attached to the piston body in an axial direction by the play-free clip connection.

3. The piston according to claim 1, wherein the at least one sealing element includes at least one of an inner sealing element received in an inner receiver of the piston body and an outer sealing element received in an outer receiver of the piston body.

4. The piston according to claim 3, wherein at least one of the inner sealing element and the outer sealing element is attached to the piston body by the cap.

5. The piston according to claim 3, wherein at least one of the inner receiver is designed to be complementary to the inner sealing element in an unloaded state and the outer receiver is designed to be complementary to the outer sealing element in the unloaded state.

6. The piston according to claim 5, wherein at least one of the inner receiver and the outer receiver has no undercut in which the inner or outer sealing element engages in a radial direction.

7. The piston according to claim 5, wherein the piston body is designed such that, viewed in an axial direction, at least one of the inner sealing element and the outer sealing element is not concealed by the piston body.

8. A gear-change selector module for a gearshift of a motor vehicle, wherein the gear-change selector module comprises at least one, piston according to claim 1.

9. A method for mounting a piston of a gear-change selector module, wherein the piston has a piston body, a cap, and at least one of an inner sealing element and an outer sealing element, the method comprising:
   a) insertion of at least one of the inner sealing element into an inner receiver of the piston body in the axial direction and the outer sealing element into an outer receiver of the piston body in the axial direction, and
   b) fixing of the cap to the piston body by a play-free clip connection.

10. The method according to claim 9, wherein on insertion of the at least one of the inner sealing element and the outer sealing element in step a), the at least one of the inner sealing element and the outer sealing element is not stretched.

11. The piston according to claim 2, wherein the at least one sealing element is includes at least one of an inner sealing element received in an inner receiver of the piston body and an outer sealing element which is received in an outer receiver of the piston body.

12. The method according to claim 4, wherein at least one of the inner receiver is designed to be complementary to the inner sealing element in an unloaded state and the outer receiver is designed to be complementary to the outer sealing element in the unloaded state.

13. The method according to claim 6, wherein the piston body is designed such that, viewed in an axial direction, at least one of the inner sealing element and the outer sealing element is not concealed by the piston body.

14. A gear-change selector module for a gearshift of a motor vehicle, wherein the gear-change selector module comprises at least one, piston according to claim 2.

15. A gear-change selector module for a gearshift of a motor vehicle, wherein the gear-change selector module comprises at least one, piston according to claim 3.

16. A gear-change selector module for a gearshift of a motor vehicle, wherein the gear-change selector module comprises at least one, piston according to claim 4.

17. A gear-change selector module for a gearshift of a motor vehicle, wherein the gear-change selector module comprises at least one, piston according to claim 5.

18. A gear-change selector module for a gearshift of a motor vehicle, wherein the gear-change selector module comprises at least one, piston according to claim 6.

19. A gear-change selector module for a gearshift of a motor vehicle, wherein the gear-change selector module comprises at least one, piston according to claim 7.

20. The piston according to claim 4, wherein the cap includes an inner holding portion and an outer holding portion, and in a mounted state, the inner holding portion delimits the inner sealing element in an axial direction and the outer holding portion delimits the outer sealing element in the axial direction.

* * * * *